(12) United States Patent
Katcha

(10) Patent No.: US 12,712,424 B2
(45) Date of Patent: Aug. 18, 2026

(54) POWER CONVERTER AND METHOD FOR CONTROLLING THE SAME

(71) Applicant: Unico, LLC, Franksville, WI (US)

(72) Inventor: Jason Stuart Katcha, Cedarburg, WI (US)

(73) Assignee: Unico, LLC, Franksville, WI (US)

( * ) Notice: Subject to any disclaimer, the term of this patent is extended or adjusted under 35 U.S.C. 154(b) by 190 days.

(21) Appl. No.: 18/655,577

(22) Filed: May 6, 2024

(65) Prior Publication Data

US 2024/0372454 A1 Nov. 7, 2024

Related U.S. Application Data

(60) Provisional application No. 63/577,622, filed on May 6, 2023.

(51) Int. Cl.
*H02M 3/158* (2006.01)
*H02M 1/00* (2006.01)
*H02M 3/335* (2006.01)
*H02J 7/06* (2006.01)

(52) U.S. Cl.
CPC ......... *H02M 1/0012* (2021.05); *H02M 3/158* (2013.01); *H02M 3/33573* (2021.05); *H02M 3/33592* (2013.01); *H02J 7/06* (2013.01)

(58) Field of Classification Search
CPC .......... H02M 7/42; H02M 7/48; H02M 7/487; H02M 7/501; H02M 7/4826; H02M 7/497; H02M 7/49; H02M 7/4807; H02M 7/537; H02M 7/5387; H02M 7/53; H02M 7/533; H02M 7/53871; H02M 3/156; H02M 3/158; H02M 3/1588; H02M 3/155; H02M 3/1582; H02M 3/157; H02M 3/1563; H02M 3/1584
See application file for complete search history.

(56) References Cited

U.S. PATENT DOCUMENTS

2014/0169055 A1* 6/2014 Fornage .............. H02M 3/1582 363/132
2017/0170734 A1* 6/2017 Sheng ................. H02M 1/4258
2018/0367027 A1* 12/2018 Chen ....................... H02M 1/32

* cited by examiner

*Primary Examiner* — Bryan R Perez
(74) *Attorney, Agent, or Firm* — Fitch, Even, Tabin & Flannery LLP

(57) ABSTRACT

A power converter includes one or more switches; one or more electrical elements; and a control apparatus for controlling the operation of the one or more switches, the control apparatus configured to simulate one or more electrical parameters of the one or more elements and determine switch settings of the one or more switches based upon the one or more simulated electrical parameters. The control apparatus is exclusively implemented as electrical hardware.

8 Claims, 14 Drawing Sheets

POWER CONVERTER AND METHOD FOR CONTROLLING THE SAME

CROSS REFERENCE TO RELATED APPLICATION

This application claims the benefit of priority of U.S. Provisional Application 63/577,622, filed May 6, 2023, which is incorporated by reference herein in its entirety.

TECHNICAL FIELD

This invention relates generally to power converters and approaches for controlling these devices.

BACKGROUND

Switching power converters are used to convert power at one voltage to power at a different voltage. They typically consist of switching devices such as mosfet transistors, passive components inductors, capacitors, transformers, analog-to-digital ("A/D") converters, and micro-controllers units ("MCUs") that use a central processing unit ("CPU"). MCUs are used to process voltage and current feedback signals from the converter and use an algorithm implemented by computer instructions to compute switch state commands (e.g., 1=ON, 0=OFF) and accomplish a switching pattern that achieves an output goal such as a voltage or current level or waveform. The control algorithm may compute a control voltage to be used with a pulse-width modulator ("PWM") to generate switch states.

A drawback of using MCUs is the serial nature of how the CPU operates, where multiple instructions must be scheduled for execution in the CPU one instruction after another. This operation results in a delay or minimum timestep to update the control voltage in response to the feedback. This delay is typically 1 uS to 10 us for an MCU and may result in limited switching frequency and control bandwidth. These delays have resulted in various shortcomings in previous systems.

BRIEF DESCRIPTION OF THE DRAWINGS

Various needs are at least partially met through provision of power converters and approaches for operating these converters particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
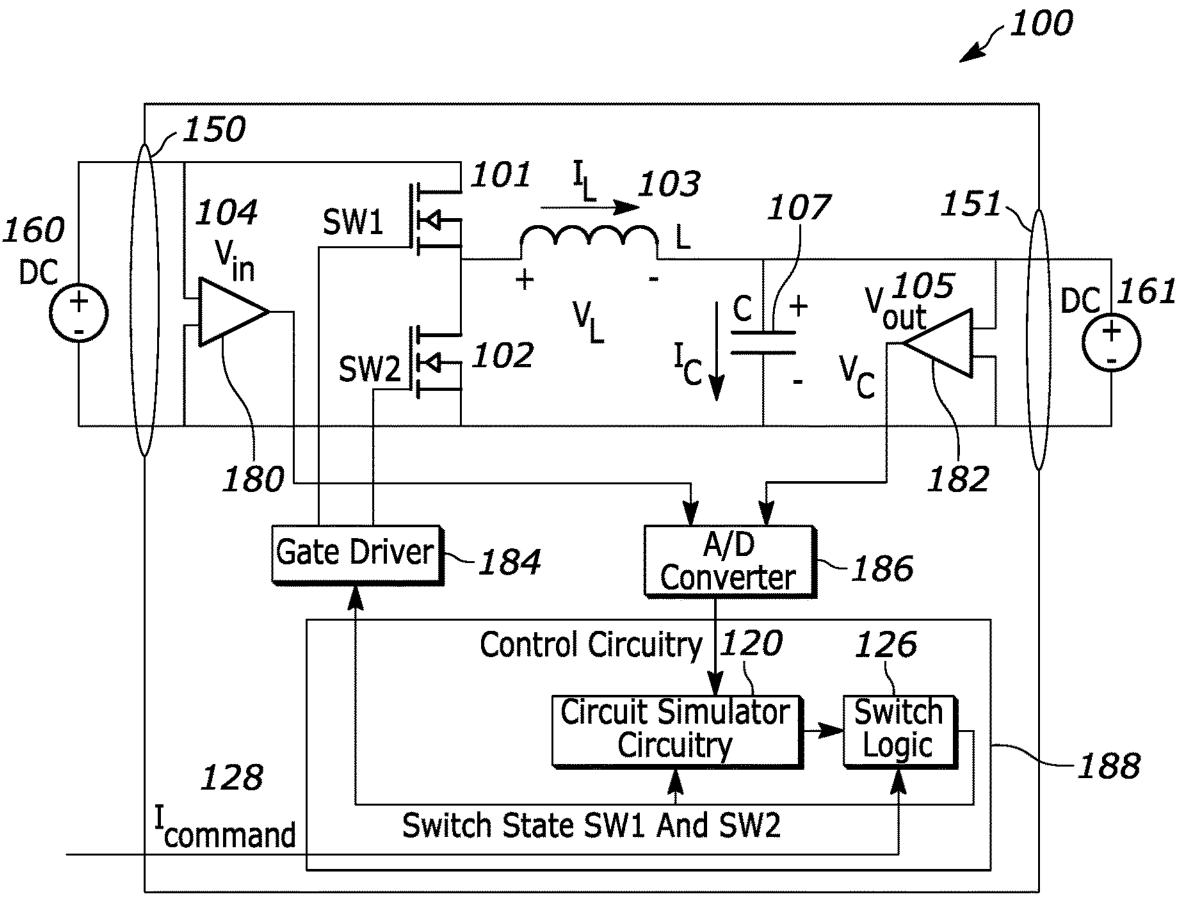
FIG. 1 comprises a circuit diagram of a bidirectional, non-isolated DC-DC converter according to various embodiments of the present invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The present approaches provide DC-DC and DC-AC converters that operate at high switching frequencies. In some aspects, power converters with isolation functions in single stages are provided. These approaches do not use MCUs or computer instructions to implement or determine the switching functions. Instead, these approaches rely exclusively on electronic hardware components to simulate circuit values (e.g., simulated inductor current) that are, in turn, used to determine switching states and control switches in the power converters. The power converters provided herein can be controlled to operate in advantageous modes of operation such as Boundary Condition Mode. Moreover, the approaches provided herein are faster, more reliable, and more efficient than previous MCU-based or computer instruction-based approaches.

In many of these embodiments, a control apparatus is configured to control a power converter. The apparatus comprises first electronic hardware circuitry (also referred to as a "circuit simulator circuitry" herein) and second electronic hardware circuitry (also referred to as "switch logic" herein). Together, the circuit simulator and switch logic are sometimes referred to as "control circuitry" herein. The first electronic hardware circuitry is configured to simulate an electrical parameter of an electrical element of a power converter. The first electronic hardware circuitry has as its input a digitized sensed measure of one parameter of an electrical element (e.g., the voltage across an inductor) and is configured to simulate another parameter of the electrical element (e.g., the current though the inductor). The second electronic hardware circuitry is coupled to the first electronic hardware circuitry. The second electronic hardware circuitry is configured to receive the simulated electrical parameter from the first electronic hardware circuitry and determine switch settings for one or more switches of the power converter based upon the simulated electrical parameter and a command input. The switch settings, when implemented by the one or more switches, achieves an output goal of the power converter. The first electronic hardware circuitry exclusively utilizes first electronic hardware components to determine the simulated electrical parameter and the second electronic hardware circuitry exclusively utilizes second electronic hardware components to determine the switch settings.

In aspects, the electrical parameter is a current, voltage, or power and the electrical element is at least one of an inductor, a capacitor, a resistor, a transistor, or a transformer. Other examples of components are possible. In still further aspects, the second electronic hardware circuitry further utilizes a received command to determine the simulated electrical parameter. In yet other aspects, the command is a current command received from an external source such as a power storage system.

In other examples, the switch settings are a first switch setting for a first switch and a second switch setting for a second switch. In still other examples, the first electronic hardware circuitry and the second electronic hardware circuitry are formed as a field programmable gate array (FPGA) or an application specific integrated circuit (ASIC). Other examples of hardware configurations are possible.

In other aspects, the output goal comprises one or more of achieving a desired voltage level, a desired current level, a desired power level, a desired power type, or a desired waveform. Other examples of output goals are possible.

In others of these embodiments, a power converter comprises one or more switches, power conversion circuitry, and a control apparatus. The power conversion circuitry includes an inductor that is coupled to the one or more switches and is configured to convert power from a first form to a second form. Activation and deactivation of the one or more switches is effective to control a current provided to the inductor and achieve an output goal of the power converter.

The control apparatus is configured to control operation of the one or more switches. The control apparatus is configured to simulate the current in the inductor and determine and control switch settings of the one or more switches based at least in part upon the simulated current. The control apparatus exclusively utilizes electronic hardware components to determine the simulated current and switch settings.

In aspects, the control apparatus comprises first electronic hardware circuitry that is configured to determine the simulated current and second electronic hardware circuitry coupled to the first electronic hardware circuitry that is configured to receive the simulated current from the first electronic hardware circuitry and determine the switch settings.

In other aspects, the power converter is configured as one of a bidirectional non-isolated DC to DC converter, a bidirectional isolated DC to DC converter, a bidirectional non-isolated DC to AC converter, and a bidirectional isolated DC to AC converter.

In still other examples, the power converter is one of a plurality of DC to AC converters deployed in a split phase configuration. In yet other examples, the power converter is one of a plurality of DC to AC converters deployed in a three-phase configuration. In still other examples, the power converter is connected in series with at least one other power converter.

In other aspects, the control apparatus is formed as a field programmable gate array. In other examples, the output goal comprises one or more of: a voltage level, a current level, a power level, a power type, or a waveform. Other examples are possible.

In others of these embodiments, a power converter comprises a full bridge inverter, a transformer, one or more power output power switches, and a control apparatus. The full bridge inverter comprises a plurality of individually controllable switches.

The transformer is coupled to the full bridge inverter. The power conversion circuitry is configured to convert DC power to AC power or covert AC power to DC power. The one or more output power switches provide an output power at an output of the power converter.

The transformer has a primary winding coupled to the full bridge inverter and a secondary winding coupled to the one or more power output switches. Activation and deactivation of the plurality of individually controllable switches and the one or more power output switches is effective to control the current of the magnetizing inductance of the transformer and achieve an output goal of the power converter.

The control apparatus is configured to control operation of the plurality of individually controllable switches and the one or more power output switches. The control apparatus is further configured to simulate the current in the primary winding of the transformer and determine and control switch settings of the plurality of individually controllable switches and the one or more output switches based at least in part upon the simulated current, wherein the control apparatus exclusively utilizes electronic hardware components to determine the simulated current and switch settings.

In aspects, the control apparatus comprises first electronic hardware circuitry that is configured to determine the simulated current. The control apparatus further includes second electronic hardware circuitry coupled to the first electronic hardware circuitry that is configured to receive the simulated current from the first electronic hardware circuitry and determine the switch settings.

In other aspects, the transformer comprises interleaved windings. Other types of structures for the transformers are possible.

In yet other examples, the power converter has an AC output that is serially connected to other power supplies as part of a three-phase configuration. In still other examples, the power converter has a DC input that is connected in parallel to other power supplies as part of a three-phase configuration.

In other of these embodiments, a power converter includes one or more switches, one or more electrical elements, and a control apparatus for controlling the operation of the one or more switches. The control apparatus is configured to simulate one or more electrical parameters of the one or more elements and determine switch settings of the one or more switches based upon the one or more simulated electrical parameters. The control apparatus is exclusively implemented as electrical hardware.

In aspects, the one or more simulated electrical parameters are at least one of a current, a voltage, a power, an electric field or a magnetic field and the one or more electrical elements are at least one of an inductor, a capacitor, a resistor, a transistor, or a transformer. In other aspects, the control apparatus utilizes one or more commands and one or more simulated electrical parameters to determine the one or more switch settings. In examples, the command is derived from an output goal of the power converter and one or more sensed parameters of the one or more elements. In still other aspects, the control apparatus utilizes one or more sensed parameters of the one or more elements to simulate one or more other parameters of the one or more elements.

In some examples, the control apparatus is implemented in a field programmable gate array (FPGA) or application specific integrated circuit (ASIC). In other examples, the electrical hardware exclusively utilizes hardware logic and memory devices.

In others of these embodiments, a power converter includes one or more switches and an inductive element coupled to the one or more switches. The activation and deactivation of the one or more switches is effective to control a current in the inductive element and achieve an output goal of the power converter. The power converter further includes a control apparatus for controlling operation of the one or more switches. The control apparatus is configured to simulate the current in the inductive element and determine the switch settings of the one or more switches based at least in part upon the simulated current. The control apparatus exclusively utilizes electrical hardware to simulate the current and determine switch settings.

In aspects, the control apparatus utilizes a sensed voltage of the inductive element to simulate the current in the inductive element. In other aspects, the control apparatus utilizes a current command and the simulated current to determine switch settings and achieve an output goal of the power converter.

In examples, the power converter is configured as one of: a bidirectional non-isolated DC to DC converter, a bidirectional isolated DC to DC converter, and a bidirectional isolated DC to AC converter. In yet other examples, the power converter is one of a plurality of DC to AC converters and the plurality of DC to AC converters are deployed in a split phase or 3-phase configuration.

In other aspects, an AC port of the power converter is connected in series or parallel with at least one other power converter. In other examples, a DC port of the power converter is connected in series or parallel with at least one other power converter.

In some examples, the control apparatus is formed as a field programmable gate array (FPGA) or application specific integrated circuit (ASIC).

In yet others of these embodiments, a power converter includes a DC port and an AC port, a full-bridge inverter comprising a plurality of individually controlled switches with the parallel connection points of the full-bridge inverter switches coupled to the DC port, a transformer with a first and second winding wherein the first winding is coupled to the series connection points of the full bridge inverter, at least one individually controlled switch coupled to a first terminal of the second transformer winding and a first terminal of the AC port, and at least one individually controlled switch coupled to the second terminal of the second transformer winding and a second terminal of the AC port. Activation and deactivation of the plurality of individually controllable switches is effective to control a magnetizing inductance of the transformer and achieve an output goal of the power converter. The power converter further includes a control apparatus that is configured to control operation of the plurality of individually controllable switches. The control apparatus is also configured to simulate the current in the magnetizing inductance of the transformer and determine switch settings of the plurality of individually controllable switches based at least in part upon the simulated current. The control apparatus exclusively utilizes electronic hardware components to determine the simulated current and switch settings.

In aspects, the power converter is one of a plurality of DC to AC converters and the plurality of DC to AC converters are deployed in a split phase or 3-phase configuration. In other examples, the AC port of the power converter is connected in series or parallel with at least one other power converter.

In yet other examples, the DC port of the power converter is connected in series or parallel with at least one other power converter. In some other examples, the AC port is connected to a utility grid wherein the current delivered to and from the grid is controlled at least in part by controlling the current in the magnetizing inductance. In yet other examples, the AC port connected to an AC load wherein the voltage delivered to the AC load is controlled at least in part by controlling the current in the magnetizing inductance.

In some other aspects, the first and second windings of the transformer have a substantially interleaved placement with respect to each other. In other examples, the DC port is coupled to a battery and the AC port is coupled to a utility grid wherein the battery can be charged and discharged from the utility grid.

Referring now to FIG. 1, one example of a bidirectional, non-isolated DC-DC power converter 100 is described. The DC-DC power converter 100 includes a first switch (SW1) 101, a second switch (SW2) 102, an inductor 103, an input voltage sensor 180 (that produces or presents a voltage Vin 104), an output voltage sensor 182 (that produces or presents a voltage Vout 105), an input (or DC) port 150 to the converter 100, an output (or DC) port 151 of the converter 100, a DC power source 160, a DC output source 161, a gate driver 184, an analog-to-digital converter 186, control circuitry 188 (e.g., a field programmable gate array (FPGA)) that includes circuit simulator circuitry 120 and switch logic 126. A current command Icom 128 may be applied to the switch logic 126. The current command Icom 128 may originate or be determined by an external source within, for example, an energy storage system, that is commanding the converter 100 to produce a specified inductor current. Other sources for the current command Icom 128 are also possible. A capacitor 107 having a current Ic is coupled to the inductor 103. Icom is sometimes also referred to as Icommand herein and in the drawings.

The first switch (SW1) 101 and the second switch (SW2) 102 may be mosfets and include body diodes. Other types of transistors or electronic switching devices (or combinations of these devices) can also be used. In examples, the first switch (SW1) 101 and the second switch (SW2) 102 may be silicon carbide (SiC) or gallium nitride (GAN) mosfets that are able to or are configured to switch at faster rates as compared to standard silicon mosfets.

DC Voltage sources 160 and 161 may be various types of voltage sources, loads, batteries, or renewable energy sources. Other examples of voltage sources are possible.

In some aspects, the first switch (SW1) 101 and the second switch (SW2) 102 can operate with switching frequencies in the 10 kHz to 100 KHz range (to mention one example of frequency ranges), but can also operate at still higher speeds or frequencies such as in the 300 kHz to 1 Mhz range. Advantageously, when operating in the 300 kHz to 1 Mhz range, the size of inductors, transformers, and capacitors of the converter 100 can be reduced.

When operating in the 300 kHz to 1 Mhz range, time steps in the range of 1 ns-20 ns range may be required to meet goal performance or control system stability objectives. As described herein, the timestep is a delay required to update a switch state or a control parameter for a pulse-width modulator as a result of feedback received from the converter. In previous microcontroller-based systems, the delay is typically 1 us to 10 us and this results in limited switching frequencies and a limited control bandwidth. Switching frequency is defined as the rate at which an electronic switch performs its switching function (e.g., is turned on and off).

The inductor 103 (also referred to herein as a "magnetizing inductance") is any type of appropriate inductor as known in the art. In one example, the inductor 103 has a value of 1 UH to 100 UH. Other example values for the inductor 102 are possible. The inductor 103 may be comprised or constructed of ferrite or any other material with high magnetic permeability and a winding or windings made of wire, litz wire or may be implemented as traces in a multi-layer printed circuit board (PCB). The core may have a gap in its magnetic circuit that substantially determines the inductance value.

The input voltage sensor 180 and output voltage sensor 182 are configured to sense voltages received at their inputs. The sensed voltages are digitized by analog-to-digital converter 186. The gate driver 184 is a circuit configured to drive and provide an appropriate gate voltage and/or current to the first switch (SW1) 101 and the second switch (SW2) 102. The gate driver 184 may be constructed of appropriate electronic components such as resistors, capacitors, transistors, or other electronic components. The input to the gate driver 184 is provided by the control circuitry 188 and represents the states that are to be set by the control circuitry 188.

The control circuitry 188 may be a field programmable gate array (FPGA), an application specific integrated circuit (ASIC), or some other hardware circuit configuration comprising electronic hardware circuit elements or components. In aspects, control circuitry 188 is implemented as a FPGA and the FPGA is an integrated circuit that is configured by a customer or designer during manufacturing. In aspects, the FPGA includes an array of configurable logic blocks and a hierarchy of reconfigurable interconnects allowing these blocks to be wired together as desired. In aspects, the logic blocks are configured to perform complex computational functions and/or act as simple logic gates such as AND or XOR gates. In some other aspects, the FPGA includes memory elements. These memory elements can include flip flops or more complete blocks of memory. As provided herein, the logic blocks and the memory devices can be configured to implement power converter control algorithms in electronic hardware and contain, include, and/or implement proportional and integral (PI) control, pulse width modulation (PWM), and filters. These algorithms can be implemented as parallel hardware circuit logic and operate at a time step equal to the FPGA clock time period (e.g., typically 1 ns to 20 ns) thereby achieving approximately one hundred times faster time steps than microcontroller-based systems. As such, it will be appreciated that a clock may be provided as part of the control circuitry 188.

It will be appreciated that the control circuitry 188 is constructed entirely of hardware electronic elements. For example, and as mentioned, the control circuitry may include logic gates (e.g., AND gates, OR gates, XOR gates, NAND gates, etc.), memory elements, transistors, and resistors to mention a few examples. The control circuitry 188 does not store or execute computer code or computer instructions.

As mentioned, control circuitry 188 includes circuit simulator circuitry 120 and switch logic 126. The circuit simulator circuitry 120 includes circuitry that determines or simulates the inductor current. The switch logic 126 is hardware electronic circuitry that utilizes the simulated inductor current to form a decision as to how to set the switches 101 and 102. These blocks are described in greater detail elsewhere herein.

Figure 2:
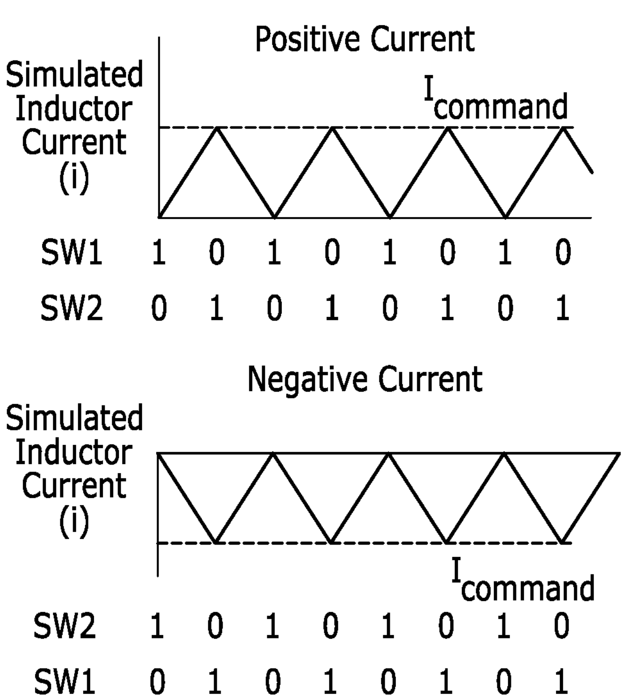
FIG. 2 comprises current waveforms of inductor current according to various embodiments of the present invention.

As mentioned, FIG. 1 illustrates a bidirectional non-isolated DC-DC converter, where the switching pattern creates triangular-shaped current waveforms. Examples of these waveforms are shown in FIG. 2. As shown in FIG. 2 and for positive current flow, the first switch (SW1) 101 turns on at zero current and turns off when a peak current is reached. After the first switch (SW1) 101 turns off, the current then flows through the second switch (SW2) 102, which may be or include a body diode. The second switch (SW2) 102 may be turned on after this transition to use the mosfet (called synchronous rectification). When the current reaches zero, the first switch (SW1) is turned on again and the cycle is repeated. In this approach, turn-on loss is minimized or eliminated. This is mode of operation is typically referred to as operation in Boundary Condition (or Conduction) Mode (BCM). As described below, dead time may be added between the pulse to limit the frequency at lower currents (this type of operation is typically referred to as operation in Discontinuous Conduction Mode (DCM)).

In operation, the first switch (SW1) 101 is turned on, then turned off, and only turned on again when the simulated inductor current of the inductor 103 reaches zero. BCM operates between Continuous Conduction Mode (CCM) where the simulated inductor current would go up and down (but not become zero) and DCM where the simulated inductive current (after reaching a peak) would return to zero and then remain at zero for some time. Operating at the boundary between CCM and DCM is referred to as being in or operating in BCM where the simulated inductor current starts at zero, goes up, comes down from a peak (when the switch is turned off), and just touches zero when the switch turns back on again and the current immediately rising, thereby producing the triangular waveform.

In CCM and DCM, switches would be turned on at definite points in time (a definite delay after the last time the switch was turned on), but in BCM the switch is turned on whenever it needs to be turned on (i.e., just as the simulated inductor current reaches zero). Operating the power converter 100 in BCM is advantageous because it greatly reduces switching losses. The switching loss for a Mosfet is approximately proportional to the magnitude of current present during the switch transition. However, SiC mosfets typically have much lower loss for turn-off transition than the turn-on transition, and since BCM has the switch turn-on when the current is zero, net switching losses can be reduced.

To achieve substantial BCM, precise knowledge of the inductor current is required to control the switches. One way to achieve this would be to use a current sensor. However, at switching frequencies of 300 kHz to 1 MHz, a current sensor and an analog-to-digital converter need a high bandwidth (>10 MHz), and this may be cost prohibitive. A resistor and voltage amplifier may be used as a current sensor but will incur losses and/or be prone to noise. The current may be sensed by measuring the voltage from drain to source of a mosfet when it is in an ON state, in series with the inductor, but this may be difficult due to the large voltage present when the mosfet is off. Also, the mosfet drain-source resistance (RDS) ON will vary with temperature causing inaccuracy. Mosfet drain-source on-resistance (RDS (on)) is the resistance between the drain and the source of a MOSFET when a specific gate-to-source voltage (VGS) is applied to bias the device to the on state. Generally speaking, as the VGS increases, the on-resistance generally decreases.

As mentioned, the approaches described herein can operate in different modes depending upon the inductor current. In DCM mode, the current is ramped up, then ramped down and hits 0 amps. Rather than activating a switch and immediately ramping the current up again (as occurs in BCM mode), in some examples a dead time is inserted when the current is 0. The amount of dead time may be determined in a number of different ways such as using a linear function or logarithmic function that produces a dead time. Other examples or approaches for determining dead time are possible.

Figures 4, 5:
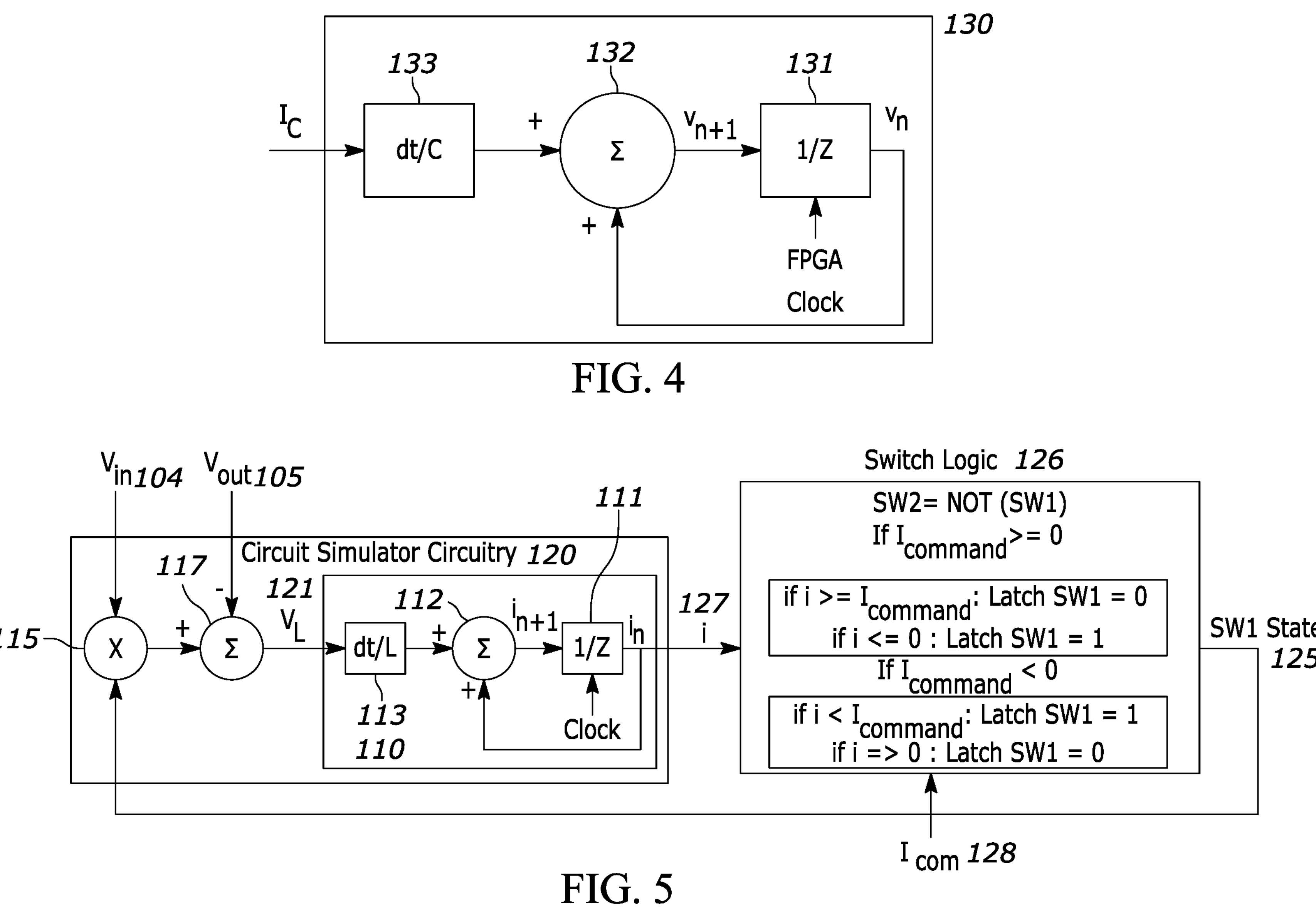
FIG. 4 comprises a diagram of a capacitor voltage simulator according to various embodiments of the present invention.
FIG. 5 comprises a diagram of a switching circuit current simulator according to various embodiments of the present invention.

The power converter 100 shown in FIG. 1 has no inductor current sensor and associated analog-to-digital converter, thereby eliminating these problematic current sensor components. FIG. 1 and FIG. 5 show a converter where the inductor current is simulated in an FPGA and the simulated current is used to select switch state.

The current of an inductor is described by the following differential equation:

$$v = L\,di/dt.$$

This can be written as an integral equation with timestep dt:

$$i_{n+1} = v\,dt/L + i_n$$

Figure 3:
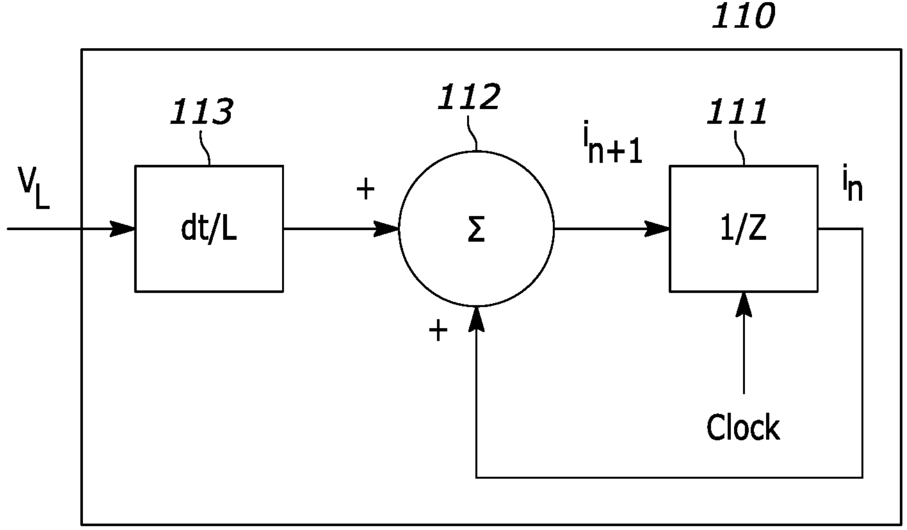
FIG. 3 comprises a diagram of an inductor current simulator according to various embodiments of the present invention.

Referring now to FIG. 3, this equation can be implemented in hardware logic as an inductor current simulator 110 in an FPGA. The hardware logic 110 includes a 1/Z block 111, which represents or implements a memory delay or latch with the FPGA clock to latch the value presented to the input. The block 113 represents dt/L in the equation and is a multiplier block with gain dt/L where dt is the clock period in seconds and L is the inductor inductance in Henrys. Summation block 112 is a summation block (Σ block) providing an addition function with the polarity shown. The signal values are represented in binary format and the blocks use combinatorial logic to compute an output value before the next clock cycle.

The inductor current simulator 110 can be used in the circuit simulator circuitry 120 of FIG. 5 to compute the current in the inductor of the DC-DC converter 100. Here the signal V L (121) is computed to be measured Vin (104) multiplied by the SW1 state (125) minus measured Vout (105). The switch logic 126 with the logic rules described herein uses the simulated inductor current (127) and the commanded current Icom (128) to set the states of the first switch (SW1) 101 and the second switch (SW2) 102.

The switch logic 126 is now described in greater detail. The switch logic 126 receives the simulated current 127 and Icom 128 as inputs and outputs a switch state 125 for the first switch SW1. The state of the second switch (SW2) 102 is the opposite of the state of the first switch (SW1) 101. These states are a 1 or a 0 and activate or deactivate the first switch (SW1) 101 and the second switch (SW2) 102.

As mentioned, the state of the first switch (SW1) 101 and the second switch (SW2) 102 are the opposite of each other. If Icom is greater than or equal to zero, then if the simulated current 127 is greater than Icom, the first switch (SW1) 101 is latched to zero. If the simulated current is less than or equal to zero, then the first switch (SW1) 101 is latched to 1.

If Icom is less than zero, then if the simulated current 127 is less than Icom, the first switch (SW1) 101 is latched to 1. If the simulated current is greater than or equal to zero, then the first switch (SW1) 101 is latched to zero.

In other aspects, the power converter 100 may have voltage control and/or current control loops that output the inductor current command Icom 128 and this voltage and/or current control loops may be implemented in the same FPGA, a different FPGA, an MCU, or a CPU.

Referring now to FIG. 4, the voltage of a capacitor (e.g., the capacitor 107) may also be simulated in an FPGA as a capacitance voltage simulator 130. The block dt/C 133 is the FPGA clock period dt divided by the capacitor capacitance C. The element 132 is a summation operator. A 1/Z block 131 represents or implements a memory delay or latch with the FPGA clock to latch the value presented to the input. The capacitance voltage simulator 130 and inductor current simulator 110 may be combined in various configurations to simulate voltages and currents of other power circuits, and the simulated values may be used to select the switch states of a power converter. Circuits that may be simulated include resonant, flyback or other power electronics topologies. The simulated voltage of the capacitor can be used for various purposes such as potentially setting switches.

Figure 6:
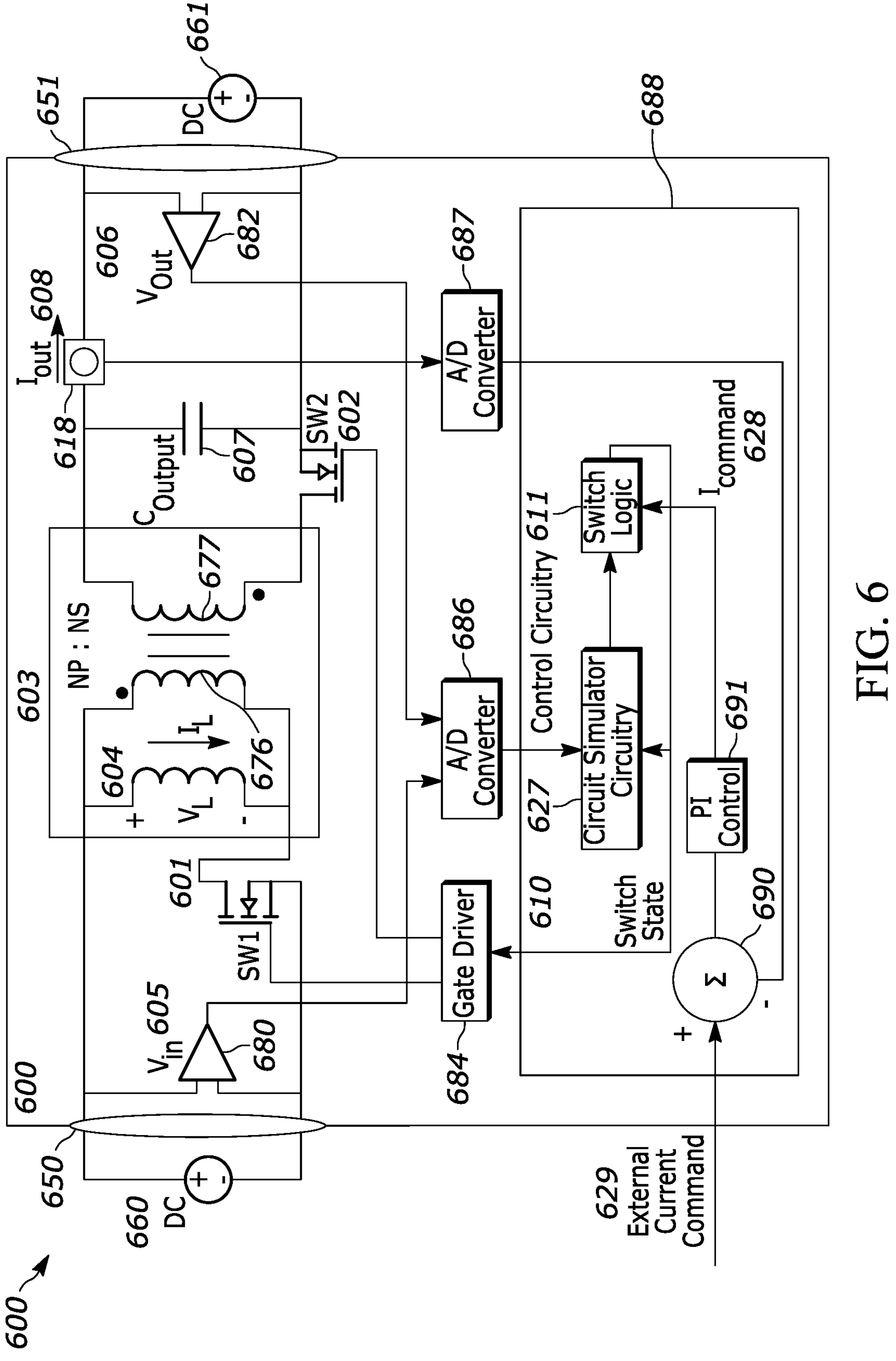
FIG. 6 comprises a circuit diagram of an isolated bidirectional DC-DC converter according to various embodiments of the present invention.

Referring now to FIG. 6, a bidirectional isolated flyback DC-DC converter 600 is described. The DC-DC converter 600 includes a first switch (SW1) 601 and a second switch (SW2) 602 that are deployed on opposite sides of a flyback transformer 603. The first switch (SW1) 601 and the second switch (SW2) 602 may be mosfets and include a body diode. Other types of transistors or electronic switching devices can also be used. In examples, the first switch (SW1) 601 and the second switch (SW2) 602 may be silicon carbide (SiC) or gallium nitride (GAN) mosfets that are able to switch at faster rates as compared to standard silicon mosfets. A capacitor 607 is coupled to the output of the transformer 603. Iout 608 can be measured at the output of the transformer 603 by a current sensor 618. A clock may also be provided as part of the control circuitry 688.

The flyback transformer 603 has magnetizing inductance (LM) or inductor 604 with a turns ratio NP:NS, where NP is the number of turns of the primary winding (676) and NS is the number of turns of the secondary windings (677). It will be appreciated that the designation of primary and secondary windings is arbitrary and the magnetizing inductance 604 may be represented on either side of the transformer 603. In examples, the magnetizing inductance 604 has a value of 1 uH to 100 uH. Other examples or ranges are possible.

Circuit simulator circuitry 610 simulates the current (producing a simulated inductor current 627) of the transformer magnetizing inductance LM 604. A switch logic function 611 received the simulated current 627 and selects the state of the first switch (SW1) 601 and the second switch (SW2) 602 based upon the simulated current 627 and a magnetizing inductance current command Icom 628. The Icom 628 may be an internal signal that indicates or represents instructions received from an external source (e.g., a power storage system) instructing the DC-DC converter 600 to produce the current described by the Icom 628.

The DC-DC converter 600 additionally includes an input (DC) port 650 that includes the input voltage sensor 680, which produces a sensed input voltage Vin 605; an output (DC) port 651 that includes an output voltage sensor 682 with a sensed output voltage Vout 606; a DC input power source 660; a DC output source 661; a gate driver 684; an analog-to-digital converter 686 that digitizes sensed voltages to be used by the circuit simulator 610; control circuitry 688 (e.g., a FPGA) that includes circuit simulator circuitry 610 and switch logic 611. An external command 629 (e.g., specifying a current desired in the at the output 651). The external command 629 may originate from an external power storage system to give one example.

The external command 629 and output of the analog-to-digital converter 687 are applied to a summer 690, which takes the difference between the command 629 and the output of the analog-to-digital converter 687 (digitized current Iout 608) to obtain an error, and the difference is applied to a Proportional/Integral (PI) control function 691, which applies a gain or accumulates values over time. The output of the PI control function 691 is the current command Icom 628, which is fed to the switch logic 611.

The control circuitry 688 includes the circuit simulator circuitry 610, switch logic 611, summer 690, and PI control block 691. Control circuitry 688 may be a field programmable gate array (FPGA), an application specific integrated circuit (ASIC), or some other hardware circuit configuration. In aspects, control circuitry 688 is implemented as a FPGA and the FPGA is an integrated circuit that is configured by a customer or designer during manufacturing. As described elsewhere herein, the FPGA includes an array of configurable logic blocks and a hierarchy of reconfigurable interconnects allowing these blocks to be wired together as desired. The logic blocks are configured to perform complex computational functions and/or act as simple logic gates such as AND or XOR gates. In some aspects, the FPGA includes memory elements. These memory elements can include flip flops or more complete blocks of memory. As provided herein, the logic blocks and the memory devices can be configured to implement power converter control algorithms contain proportional and integral control (PI), pulse width modulation (PWM), and filters. These algorithms can be implemented as parallel hardware circuit logic and operate at a time step equal to the FPGA clock time period (e.g., typically Ins to 20 ns) thereby achieving approximately one hundred times faster time step than microcontrollers.

The input voltage sensor 680 and output voltage sensor 682 are configured to sense voltages received at their inputs and the sensed voltages are coupled to the analog-to-digital converter 686. The gate driver 684 is a circuit configured to provide an appropriate voltage and/or current to the first switch (SW1) 601 and the second switch (SW2) 602. The input to the gate driver 684 is provided by the control circuitry 688 and represents the states that are to be set by the control circuitry 688. The analog-to-digital converter 686 converts analog voltages and/or currents to digital values that are coupled to the circuit simulator 610.

Figure 7:
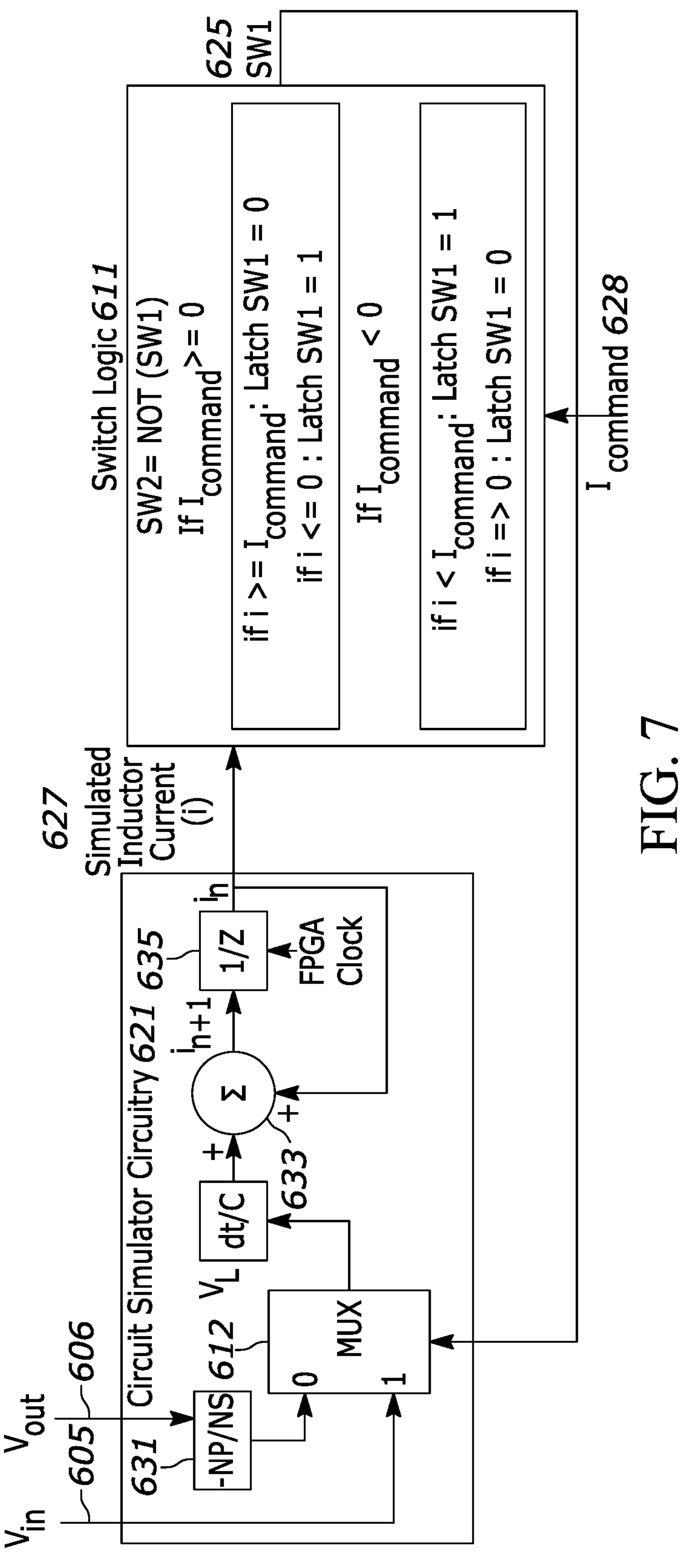
FIG. 7 comprises a diagram of an isolated DC-DC circuit simulator and switch logic according to various embodiments of the present invention.

Referring now to FIG. 7, one example of the operation of the isolated DC-DC circuit simulator circuitry 610 and switch logic 611 is described in greater detail. The circuit simulator 610 includes a −NP/NS block 631, a multiplexor 612, a dt/L block 621, a summer 633, and a 1/z block 635. The purpose of the −NP/NS block 631 is to apply this value to Vout 606. The multiplexor 612 selects between Vin 605 and Vout 606.

Figure 8:
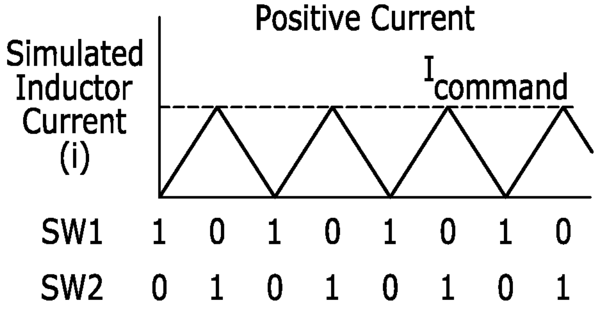
FIG. 8 comprises wave from diagrams of isolated DC-DC waveforms according to various embodiments of the present invention.
Figure 8:
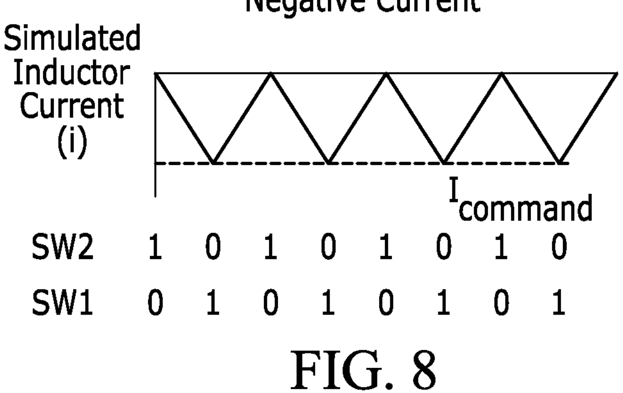

The circuit simulator 610 produces a simulated current 627 of the inductor 604 and the simulated current 627 is used by switch logic 611 to set the switch states for the first switch (SW1) 601 and the second switch (SW2) 602. In these regards, the circuit simulator 610 implements the equation above by taking (and selecting between) inputs Vin 605 and Vout 606 and simulating the current in the magnetizing inductance 604. Referring now to FIG. 8, the switch logic 611 selects which input of the multiplexer 612 to choose as between Vin 605 and Vout 606 (multiplied by-NP/NS) for the input VL 621 for the current simulator 610. The block dt/L 621 is the FPGA clock period divided by the value of the magnetizing inductance 604.

When the signal to or controlling the first switch (SW1) 601 is a logic 1, the first switch (SW1) 601 is on and the current in the magnetizing inductance 604 is increasing and a current, equal to the magnetizing inductance current, flows from the input port 650 with Vin 660 to the primary windings 676 of the transformer 603. When the first switch (SW1) 601 is off and the second switch (SW2) 602 is on, the current in the magnetizing inductance 604 is decreasing and a current, equal to the magnetizing inductance current times the turns ratio NP/NS, flows to the output port 651 with Vout 661 from the secondary side of the transformer. With the exemplary switch logic function 611 shown in FIG. 7, representative magnetizing inductance current waveforms are shown in FIG. 8, where BCM is achieved or implemented for the bidirectional isolated flyback DC-DC converter 600.

The switch logic 611 is now described in greater detail as shown in FIG. 7. The switch logic 611 receives the simulated current 627 and Icom 628 as inputs and outputs a switch state 625 for the first switch SW1. The state of the second switch (SW2) 602 is the opposite of the state of the first switch (SW1) 601. These states are a 1 or a 0 and activate or deactivate the first switch (SW1) 601 and the second switch (SW2) 602. A purpose of the switch logic 611 shown in FIG. 7 is to operate the first switch (SW1) 601 and the second switch (SW2) 602 in BCM mode.

As mentioned, the state of the first switch (SW1) 602 and the second switch (SW2) 602 are the opposite of each other. If Icom 628 is greater than or equal to zero, then if the simulated current 627 is greater than Icom 628, the first switch (SW1) 601 is latched to zero. If the simulated current is less than or equal to zero, then the first switch (SW1) 601 is latched to 1.

If Icom is less than zero, then if the simulated current 627 is less than Icom, the first switch (SW1) 601 is latched to 1. If the simulated current is greater than or equal to zero, then the first switch (SW1) 601 is latched to zero.

As with the other examples described herein, the system 600 may be operated in various modes of operation such as BCM mode and/or DCM mode. The waveforms of the simulated inducted current 627 along with the state the first switch (SW1) 601 and second switch (SW2) 602 produced by utilizing the switch logic 611 of FIG. 7 are shown in FIG. 8. FIG. 8 shows the power converter 600 operating in BCM mode where the first switch (SW1) 601 and the second switch (SW2) 602 are operated to generate with the waveforms indicated. For positive current, the first switch (SW1) 601 is turned on, then turned off when peak current is determined, and only turned on again when the simulated inductor current 627 of the inductor 603 reaches zero. The process then is repeated. The second switch (SW2) 602 is operated in the opposite state during these operations. As mentioned, although the switch logic 611 is structured to operate the power converter in BCM mode, the power converter 600 could also operate in DCM mode or a combination of DCM and BCM modes.

Figure 9:
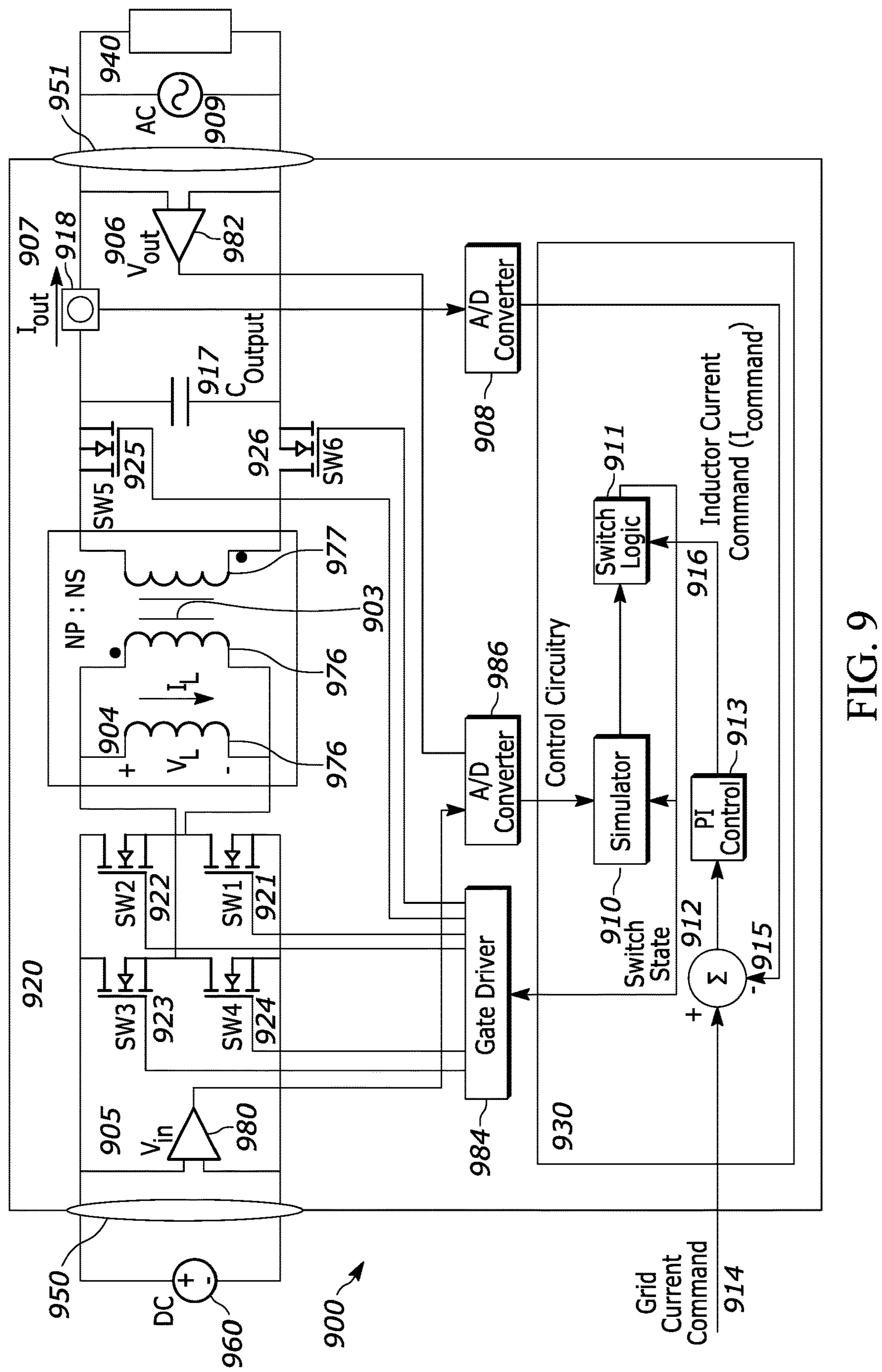
FIG. 9 comprises a circuit diagram of an isolated bidirectional DC-AC converter according to various embodiments of the present invention.

Referring now to FIG. 9, a bidirectional DC-AC power converter 900 with isolation is described. The power converter 900 includes an output (AC) port 951 with Vout 906. A grid current command 914 may be received and be proportional to and have the same polarity as the rectified AC voltage, providing unity or near-unity power factor. The grid current command 914 may originate from an external source such as a power storage system. The difference between the grid current command 914 and an output current 907 is fed to a Proportional/Integral (PI) control function 913 and the output of the PI control function 913 becomes a current command Icom 916 that is utilized as described below.

The power converter 900 includes a first switch (SW1) 921, a second switch (SW2) 922, a third switch (SW3) 923, and a fourth switch (SW4) 924, an input (DC) port 950 with an input voltage sensor 980 producing a sensed voltage Vin 905, and the output (AC) port 951 with a sensed Vout 906. The switches 921, 922, 923, and 924, may be mosfets or other types of switching devices. Together, the first switch (SW1) 921, the second switch (SW2) 922, the third switch (SW3) 923, and the fourth switch (SW4) 924 form a full-bridge inverter 920.

As mentioned, the power converter 900 is a bidirectional flyback DC-AC converter with isolation and also provides DC-DC function capability. The DC side of the power converter 900 has the input (DC) port 950 with a sensed voltage Vin 905 and the full-bridge inverter 920 including the first switch (SW1) 921, the second switch (SW2) 922, the third switch (SW3) 923, and the fourth switch (SW4) 924 with the inverter outputs connected to a first winding 976 of a transformer 903, and the AC side of the transformer 903 has a second winding 977 connected to the output (AC) port 951 (having sensed Vout 906) through a fifth switch (SW5) 925 and a sixth switch (SW6) 926. The power converter 900 does not need a current sensor connected to either winding 976, 977 of the transformer 903 and instead uses circuit simulator circuitry 910 to simulate the current in a magnetizing inductance or inductor 904 of the transformer 903. Control circuitry 930 simulates the current in the inductor 904 and determines the various switch states for the first switch (SW1) 921, the second switch (SW2) 922, the third switch (SW3) 923, the fourth switch (SW4) 924, the fifth switch (SW5) 925 and the sixth switch (SW6) 926.

The transformer 903 may be composed of ferrite, or other material with magnetic permeability, and windings that may be made of electrically conductive wire, litz wire, or printed circuit board (pcb) traces, or any combination thereof. There may be a gap in the magnetic circuit of the core that may effectively determine the magnetizing inductance 904 of the transformer 903. The windings 976, 977 may be composed of one or more turns with primary turns NP and secondary turns NS. The transformer 903 may be configured to have primary windings and secondary windings interleaved to reduce any transformer leakage inductance.

The control circuitry 930 includes the circuit simulator circuitry 910, switch logic 911, summer or differencer 912, and the PI control function 913. The circuit simulator circuitry 910 simulates the current in the inductor 904 and the switch logic 911 selects the state of the switches 921, 922, 923, 924, 925, and 926 based on a simulated current 937 and the grid current command 914 (eventually becoming the current command Icom 916). As mentioned, the grid current command 914 may be instructions received from an external source (such as elements of a power storage system). A clock may also be provided as part of the control circuitry 930.

The power converter 900 additionally includes a DC power source 960; an AC output source 909; a gate driver 984; and an analog-digital converter 986. The grid current command 914 and output of the analog-to-digital converter 987 are applied to the summer 912, which takes the difference between the grid current command 914 and the output of the analog-to-digital converter 987 to obtain an error, and the PI control function 913, which applies a gain to the signal or accumulates values over time. The output of the PI control function 913 is the current command 916, which is fed to the switch logic 911.

As stated, the control circuitry 930 includes the circuit simulator circuitry 910, switch logic 911, summer 912, and PI control function 913. Control circuitry 930 may be a field programmable gate array (FPGA), an application specific integrated circuit (ASIC), or some other hardware circuit configuration. In aspects, the FPGA includes an array of configurable logic blocks and a hierarchy of reconfigurable interconnects allowing these blocks to be wired together as desired. The logic blocks are configured to perform complex computational functions and/or act as simple loc gates such as AND or XOR gates. In some aspects, the FPGA includes memory elements. These memory elements can include flip flops or more complete blocks of memory. As provided herein, the logic blocks and the memory devices can be configured to implement power converter control algorithms contain proportional and integral control (PI), pulse width modulation (PWM), and filters. These algorithms can be implemented as parallel hardware circuit logic and operate at a time step equal to the FPGA clock time period (e.g., typically Ins to 20 ns) thereby achieving one hundred times faster time step than microcontrollers.

The input voltage sensor 980 and output voltage sensor 982 are configured to sense voltages received at their inputs with sensed Vinput 905 and sensed Voutput 906 that are couple to analog-to-digital converter 986. The gate driver 984 is a circuit configured to provide an appropriate voltage and/or current to the switches 912, 922, 923, 924, 925, and 926. The inputs to the gate driver 984 are provided by the control circuitry 930 and represent the states that are to be set by the control circuitry 930.

Figure 10:
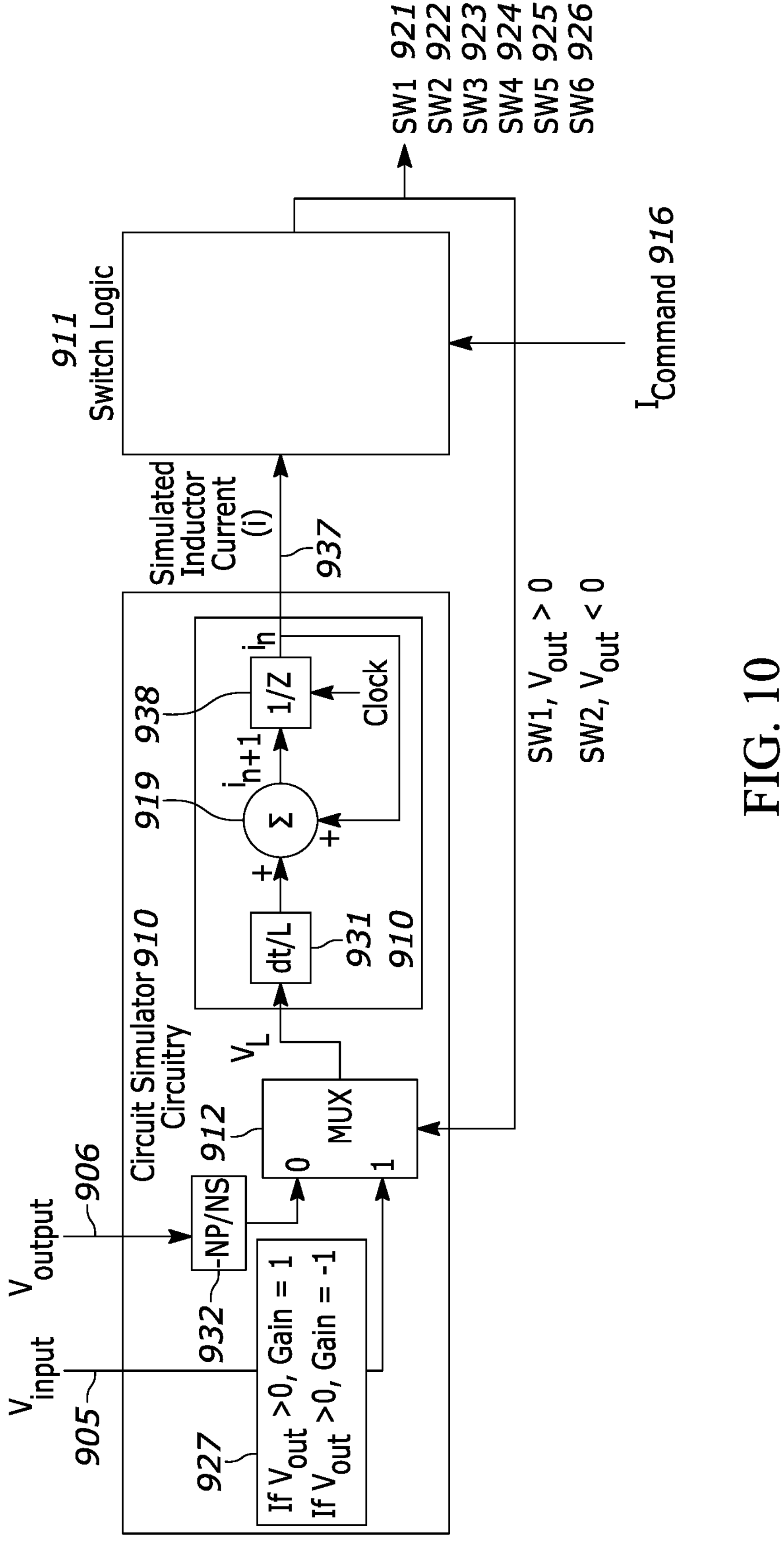
FIG. 10 comprises a diagram of a circuit simulator and switch logic according to various embodiments of the present invention.

Referring to FIG. 10, the circuit simulator circuitry 910 includes a logic block 927 (which sets the gain of Vin to be positive 1 when Vout is greater than 0 and sets the gain to be −1 when Vout is less than 0), a negative turns ratio (−NP/NS) block 932, a multiplexor 912, a dt/L block 931, a summer 919, and a 1/Z block 938. The circuit simulator circuitry 910 uses the voltage Vin 905 (measured at the DC port 950) and the AC voltage Vout 906 (measured at the AC Port 951) as inputs for the inductor current simulator circuitry 910, where the dt/L block 931 is the FPGA clock period divided by the value of transformer magnetizing inductance 904. The multiplexer 912 selects either the Vin 905 measure, with sign determined by Vout 906 polarity as shown in logic block 927, or Vout 906 multiplied by negative turns ratio block (−NP/NS) 932, to be applied to the dt/L block 931 of the current simulator circuitry 910. The selection is made based upon the state of the first switch (SW1) 921 with the Vin 905, with indicated gain, selected when the state is 1 and Vout 906 multiplied by negative turns ratio block (−NP/NS) 932 selected when the state is 0.

The power converter 900 is bidirectional and can source or sink power from the AC source. It can operate in all four quadrants of current and voltage polarity present at AC Port 951. The following example describes how the current simulator circuitry 910 and switch logic 911 may operate in one quadrant. When positive current (I out 907>0) is required and the AC voltage at the AC Port 951 is positive (sensed Vout 906>0), the first switch (SW1) 921 and the third switch (SW3) 923 are turned on and the current in the magnetizing inductance 904 increases. When the simulated current 937 reaches the commanded current Icom 916, the first switch (SW1) 921 and the third switch (SW3) 923 are turned off and the current in the magnetizing inductance 904 flows through the secondary winding 977 and the fifth switch (SW5) 925 to the output capacitor 917 and AC Port 951. The current during this period also flows through the sixth switch (SW6) 926, either through its body diode or the device may be turned on for synchronous operation where the sixth switch (SW6) 926 has resistance of the Mosfet RDS ON (the drain-to-source resistance).

Figure 11:
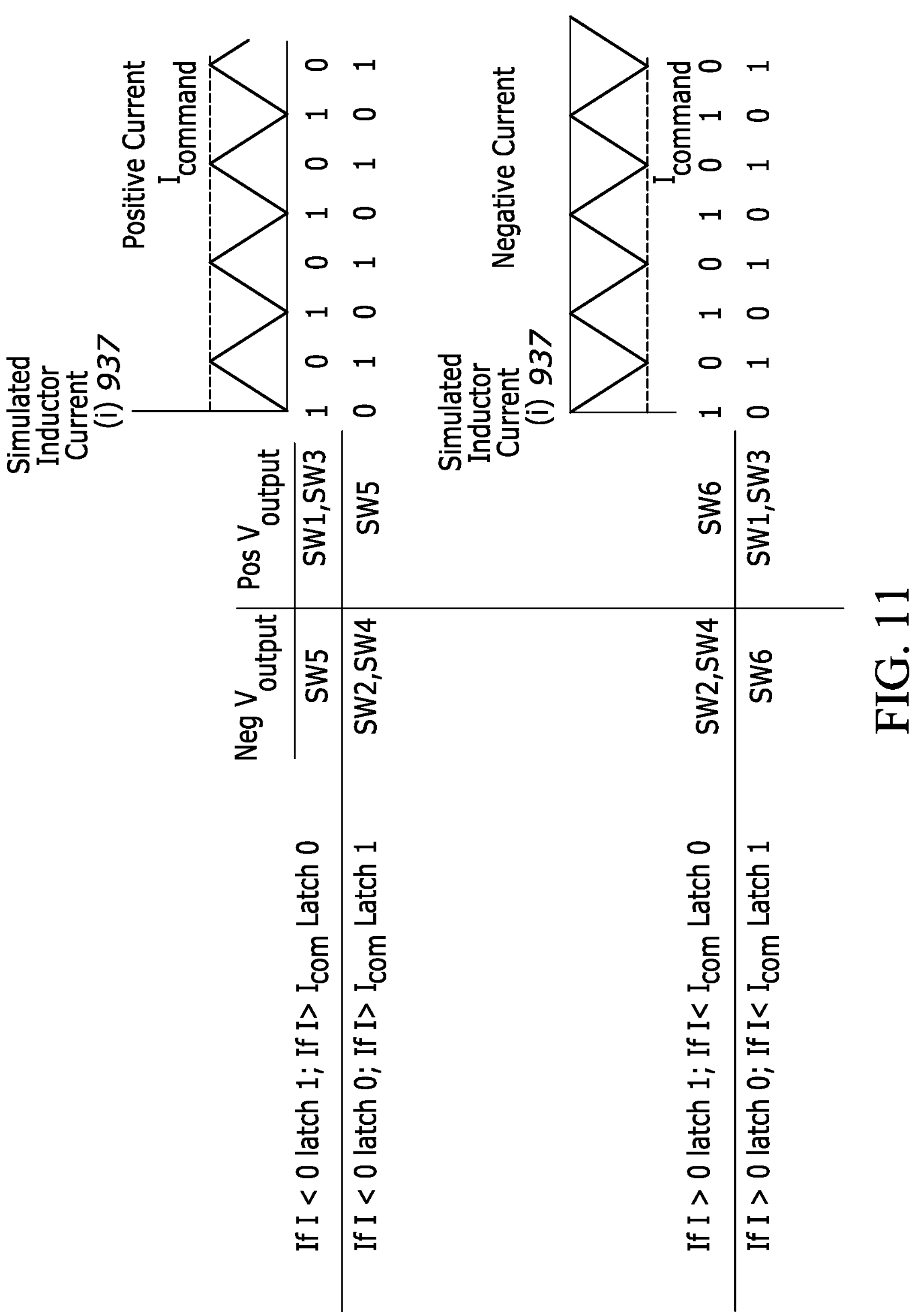
FIG. 11 comprises logic and current waveforms according to various embodiments of the present invention.

FIG. 11 illustrates the operation in all four quadrants of voltage and current at AC Port 951 with sensed Vout 906. BCM is achieved in all four quadrants of voltage and current present at the AC Port 951. The simulated current 937, sensed output voltage Vout 906, and Icom 916 are used to make latching decisions for the switches 921, 922, 923, 924, 925, and 926.

Figure 12:
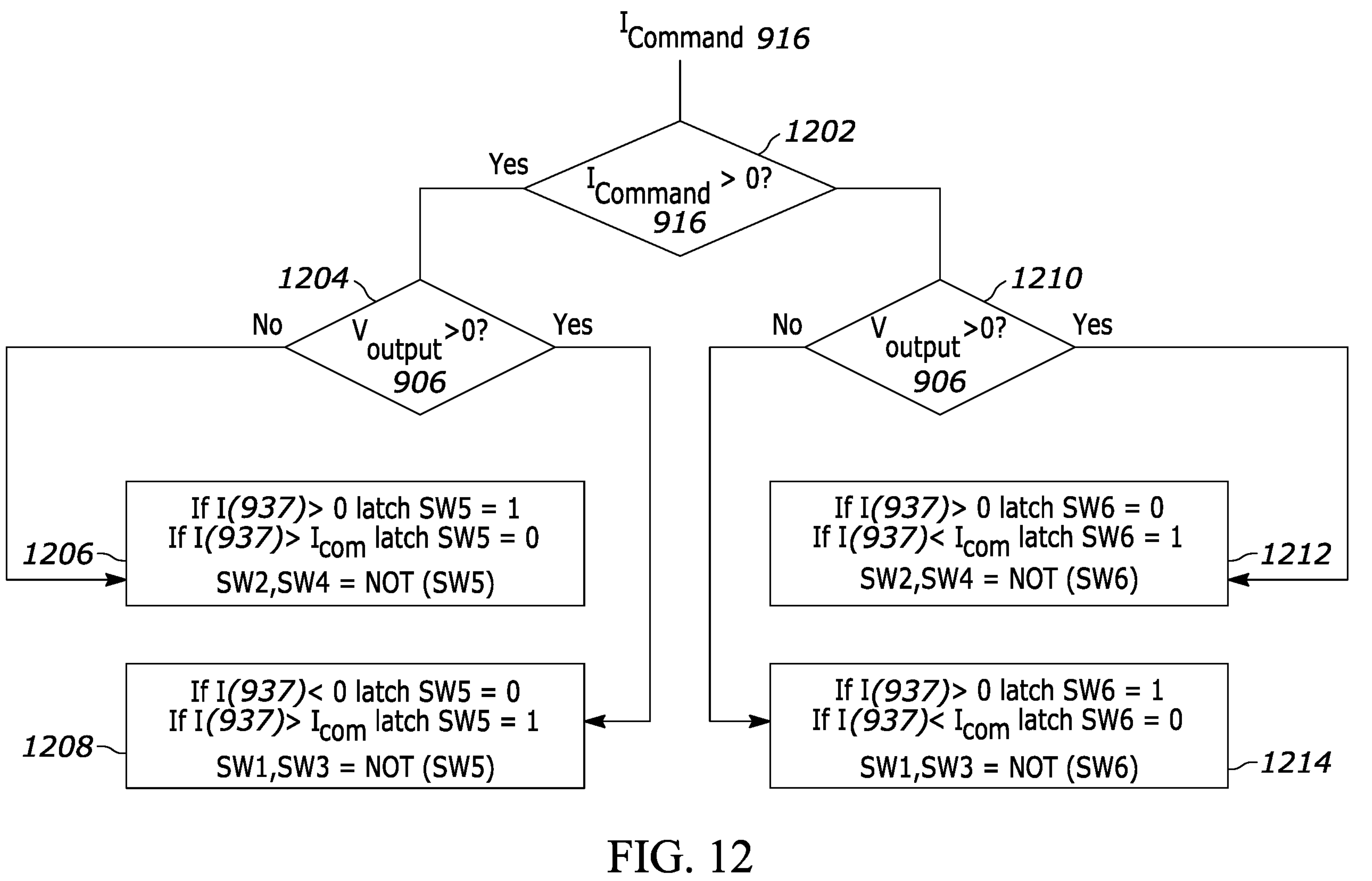
FIG. 12 comprises a logic diagram according to various embodiments of the present invention.

As shown, the power converter 900 may be operated in various modes of operation such as BCM mode and/or DCM mode. The waveforms of FIG. 11 show the operation of the power converter 900 in BCM mode. The waveforms of the simulated inductor current 937 along with the state the switches 921, 922, 923, 924, 925, and 926 produced by utilizing the switch logic 911 of FIG. 12 are shown in FIG. 11. For positive or negative simulated inductor currents, checks are made for the sensed output voltage Vout 906. Depending upon whether Vout 906 is positive or negative, whether the output current Iout 907 as measured by a current sensor 918 is positive or negative, and the value of the output current 907 as compared to the current command Icom 916, various switches are latched with a value of one or zero as shown in FIG. 12. As mentioned, although the switch logic 911 is structured to operate the power converter in BCM mode, the power converter 900 could also operate in DCM mode or a combination of DCM and BCM modes. This operation is also described below with respect to FIG. 12.

Referring now to FIG. 12, one example of the operation of switch logic 911 is described. It will be appreciated that this is implemented as electronic hardware components as described elsewhere herein.

At step 1202, it is determined if the Icommand 916 is greater than zero. If the answer is affirmative, then control continues at step 1204. If the answer is negative, then control continues at step 1210.

At step 1204, it is determined whether sensed Vout 906 is greater than zero. If the answer is negative, execution continues at step 1206. If the answer is affirmative, then execution continues at step 1208.

At step 1206, a determination is made if the simulated inductor current 937 is less than zero and if this is true, the fifth switch (SW5) is latched 925 is latched to 1. If simulated inductor current 937 is greater than Icom 916, the fifth switch (SW5) 925 is latched to zero. The second switch (SW2) 922 and the fourth switch (SW4) 924 are latched to the inverse of the state of the fifth switch (SW5) 925.

At step 1208, a determination is made as to whether simulated inductor current 937 is less than zero and if this is true then the fifth switch (SW5) 925 is latched to zero. If simulated inductor current 937 is greater than Icom 916, the fifth switch (SW5) 925 is latched to 1. The first switch (SW1) 921 and the third switch (SW3) 923 are latched to the inverse state of the fifth switch (SW5) 925.

At step 1210, a determination is made as to whether sensed Vout 906 is greater than 0. If the answer is negative, control continues at step 1212. If the answer is affirmative, then control continues at step 1214.

At step 1212, a determination is made as to whether Iout 907 is greater than 0, and, if this is true, the sixth switch (SW6) 926 is latched to 0. If Iout 907 is greater than Icom 916, then the sixth switch (SW6) 926 is latched to 1. The second switch (SW2) 922 and the fourth switch (SW4) 924 are latched to the inverse of the sixth switch (SW6) 926.

At step 1214, a determination is made as to whether simulated inductor current 937 is greater than zero and if this condition is true, the sixth switch (SW6) 926 is latched to 1. If simulated inductor current 937 is greater than Icom 916 then the sixth switch (SW6) 926 is latched to 0. The first switch (SW1) 921 and the third switch (SW3) 923 are latched to the inverse of the sixth switch (SW6) 926.

Returning to FIG. 9, the AC voltage source 909 connected to the AC Port 951 may be, but is not limited to, various voltages such as 120V, 200V, 240V, 277V, 480V, and 690V to mention a few examples. The AC source 909 may be a utility grid, fossil-fuel power generator, solar/wind inverter or micro-grid. Other examples are possible. In other aspects, there may be no AC source connected to the power converter 900 and the power converter 900 may create an AC voltage at the AC Port 951 and deliver power to an AC load 940. This configuration is referred to as strand-alone mode, voltage-source mode, or grid-forming mode.

It will be appreciated that FIG. 9 illustrates one embodiment of the invention with a current control loop configured to regulate current to the AC voltage source or utility grid. The output current sensor 907 measures the current (Iout) at the power converter 900 AC port 951. The current measured is sampled by analog-to-digital converter 908 and subtracted by summer 912 from the grid current command 914 to compute a grid current error signal 915. The error signal 915 is applied to the PI control function 913, or other control function, to create an inductor current command signal 916 that is applied to the switch logic 911.

The grid current command 914 may be a sine wave that is computed or determined by measuring the AC voltage Vout 906 at the AC Port 951. A phase-locked loop (PLL) may be used to synchronize with the AC voltage and create the grid current command 914. The grid current command 914 may be phase shifted with respect to the AC voltage at Vout 906 to deliver positive or negative power flow to the grid, and/or cause reactive power to flow. This embodiment is sometimes referred to as a grid-tie inverter.

There may be still other embodiments or variations with other control algorithms. These include, but are not limited to, voltage control to provide a voltage source at the AC Port 951, where there is no AC source connected and instead there may be an AC load 940. This embodiment may be known as a voltage source, stand-alone, or grid-forming inverter.

The voltage control may also use a droop algorithm that reduces or increases the voltage magnitude in response to the current or power present at the AC Port 951, to facilitate operation with multiple stand-alone inverters connected to the AC Port 951. The frequency of the voltage at the AC Port 951 may be modified based on the current or power present at the AC Port 951.

Grid-tie and grid-forming inverters are typically comprised of a voltage source inverter and inductor output filter. The inductor value of the inductor 904 is typically 100 uH to 500 uH and must carry the output current sourced to the grid. In contrast, the required inductor by prior art may be physically large, expensive and may consume energy. Advantageously, the power converter 900 does not require an inductor for the purpose of grid current control, between the fifth switch (SW5) 925 and the sixth switch (SW6) 926 and the converter AC port 951, thereby reducing cost, weight, and complexity as compared to previous systems. The output inductor is not required because the power converter 900 controls current to the grid 907 solely by controlling the current in the magnetizing inductance 904 in the transformer 903. In the case the power converter 900 is configured as an AC voltage source, the output voltage 906, is controlled solely by controlling the current in the magnetizing inductance 904 in the transformer 903.

Figure 13:
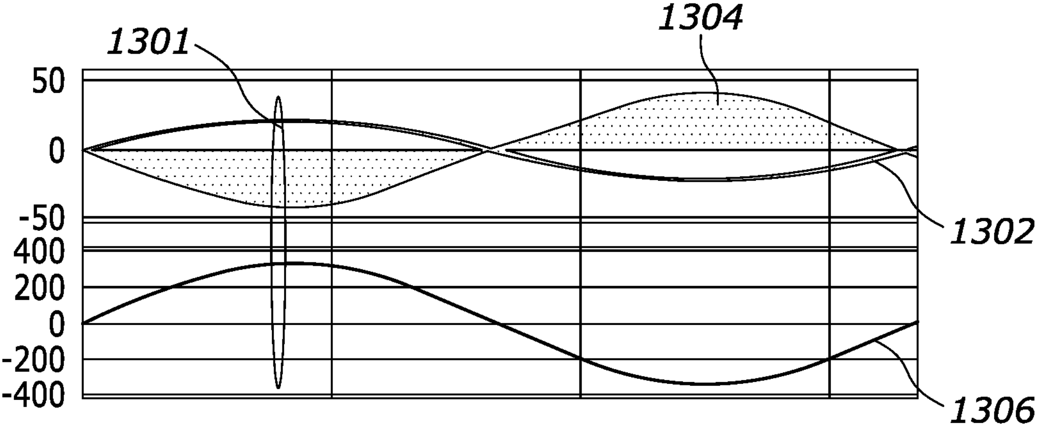
FIG. 13 comprises example waveforms including current waveforms according to various embodiments of the present invention.
Figure 13:
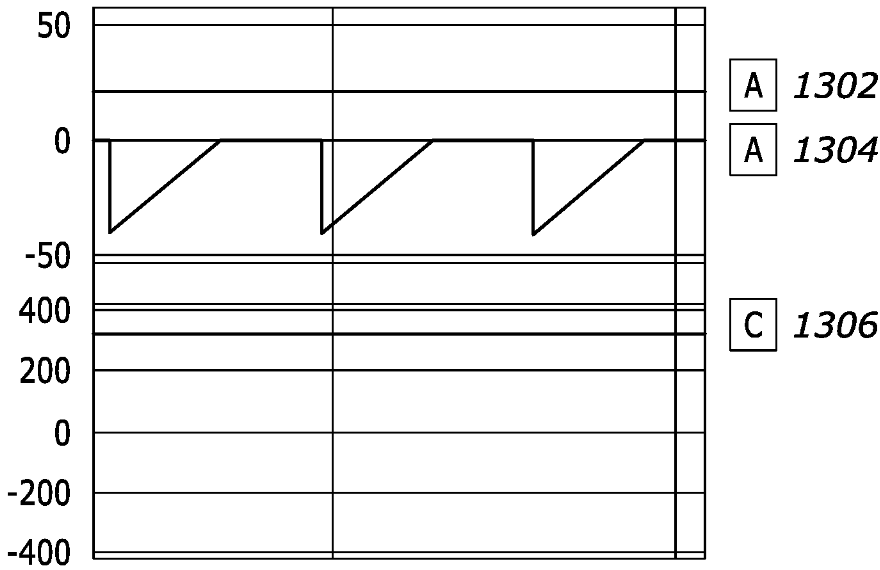

The power converter 900 with transformer 903 and control circuitry 930 (e.g., a FPGA) provides an isolated current source without the need for any output inductor. The converter's representative current source waveforms are shown in FIG. 13. The power converter 900 can also be configured as a voltage source without the need for an output inductor.

The waveforms shown include the output current 1302 (Iout), the negative of the magnetizing inductance 1304 (flowing to the secondary windings 977 of transformer), and the output voltage Vout 906. The upper diagram shows these waveforms including an area 1301, which is expanded in the second waveform diagram below.

Two or more of the power converters 900 of FIG. 9 may be connected in an electrically parallel configuration. The phase of the triangle waveform of the inductor current in the inductor 904 may be shifted with respect to the phase of the currents in the inductors of the other converters in the parallel configuration so as to provide ripple cancelation or other benefits. In the case of many of the converters in the parallel configuration, the phase shift of the current of each converter with respect to the others may be inversely proportional to the number of converters in the parallel configuration so as to provide maximum ripple cancellation or other benefits. Since each converter has individual control of the current in the magnetizing inductor 904, there is no need for a mechanism to balance currents with one or more converters in the parallel configuration.

In still another embodiment, multiple converters 900 can be connected in parallel or series to achieve higher voltage or current requirements that are possible with a single converter 900. Since each converter 900 has an isolating transformer 903, multiple converters 900 can be configured with their DC ports 950 connected in parallel and with their AC ports 951 connected in series. Conversely, multiple converters 900 can be configured with their DC ports 950 connected in series and with their AC Ports 951 connected in parallel. Various other configurations with any combination of series or parallel DC ports connections and series or parallel AC ports connections are possible.

Figure 14:
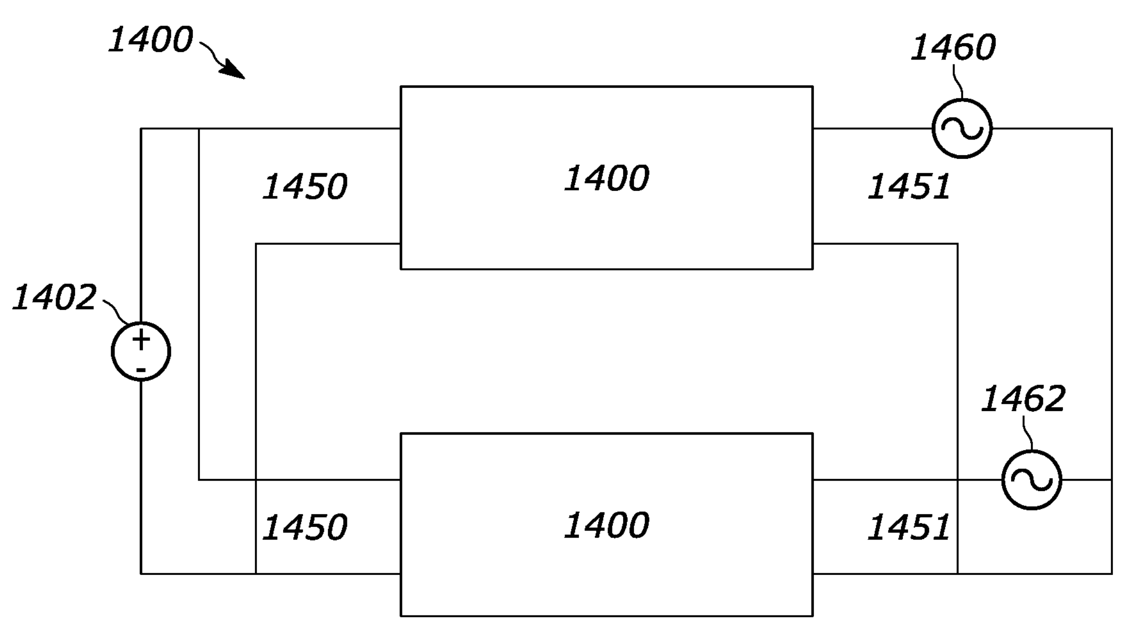
FIG. 14 comprises a diagram of an isolated DC-AC converter is a split phase configuration according to various embodiments of the present invention.

Another embodiment may include two or more converters (e.g., the converter 900) connected in a split-phase configuration. FIG. 14 illustrates two DC-AC converters 1400 (e.g., the converter 900) with DC ports 1450 connected electrically in parallel and AC ports 1451 connected electrically in series. As mentioned, the converters 1400 may be the same as the DC-AC converters 900 described above with respect to FIGS. 9-13.

In one example, the AC ports 1451 of the converters 1450 may be configured to provide two 120 VAC sources 1460 and 1462 that operate with voltages that are 180 degrees out of phase. This is typically referred to as a "240 VAC split phase" operation and is common connection type in the United States. There may be multiples of this grouping of the DC-AC converters 1400 (shown in FIG. 14) that are connected in parallel.

Figure 15:
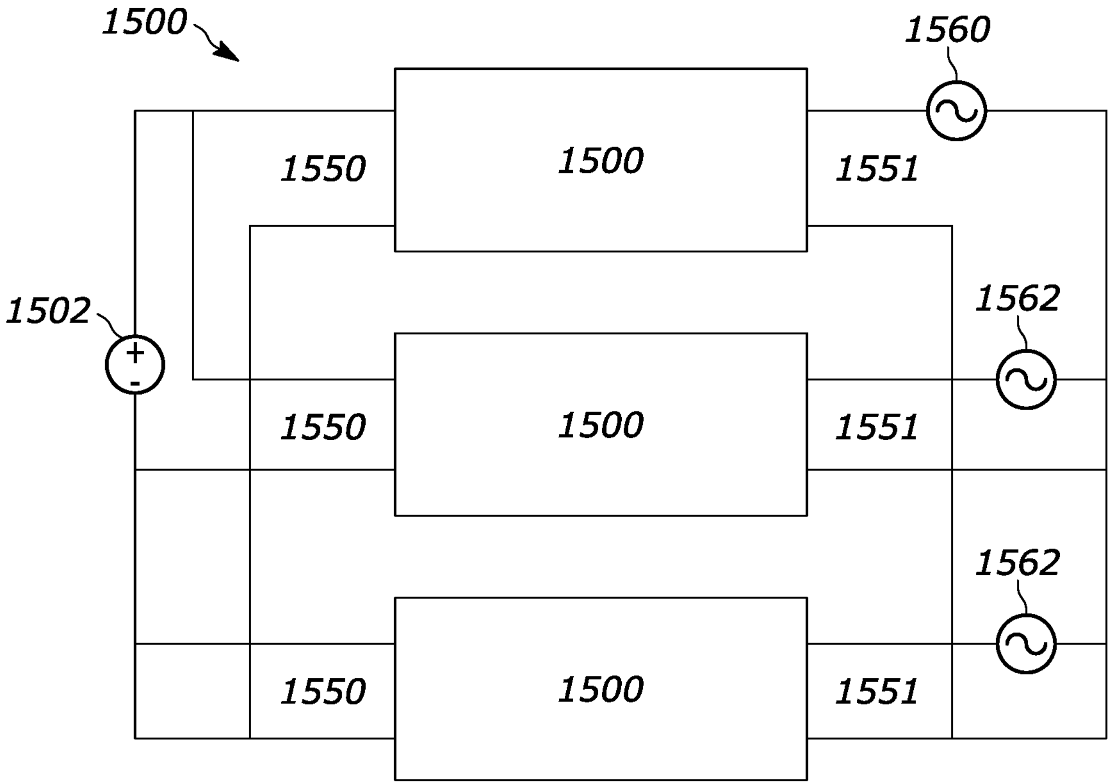
FIG. 15 comprises a diagram of an isolated DC-AC converter in a three-phase configuration according to various embodiments of the present invention.

In yet another embodiment, three or more DC-AC converters are configured and connected to converter 3 phase AC voltages. FIG. 15 illustrates three DC-AC converters 1500 with DC ports 1550 connected in parallel and with AC ports 1551 configured to provide a three-phase AC source in a Y configuration. The converters 1500 may be the same as the DC-AC converters 900 described above with respect to FIGS. 9-13.

The three or more outputs may alternatively be configured in a delta configuration. The voltage at the AC ports 1551 may be any voltage including but not limited to 120 VAC, 208 VAC, 200 VAC, 240 VAC, 277 VAC, and 480 VAC, and 690 VAC. Other examples are possible.

Figure 16:
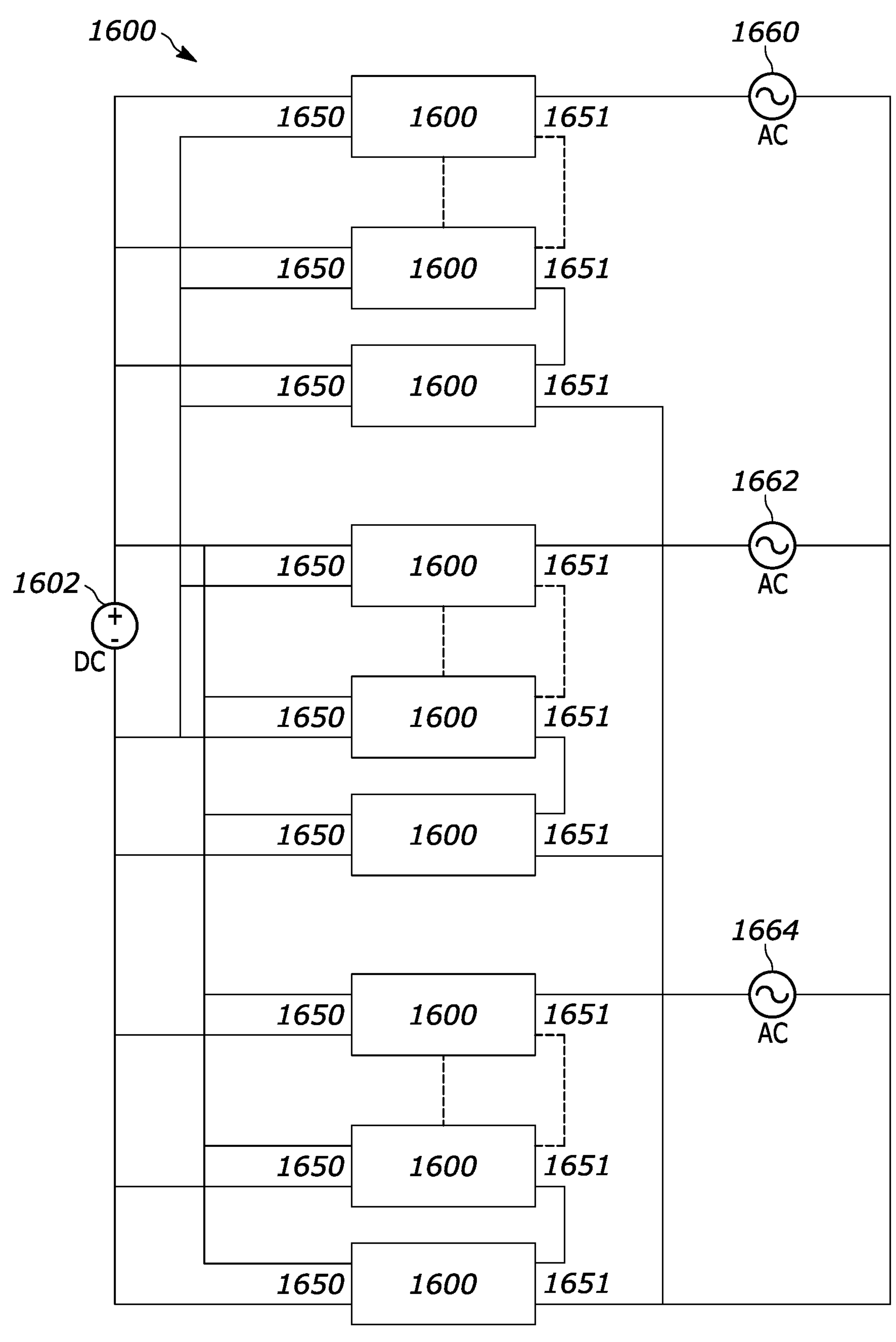
FIG. 16 comprises a diagram of an isolated DC-AC converter in series with a three-phase configuration according to various embodiments of the present invention.

In yet another embodiment, six or more DC-AC converters 1600 with AC ports 1651 have the AC ports 1651 connected electrically in series to provide three-phase AC at higher voltages. FIG. 16 illustrates six or more DC-AC converters 1600 configured to provide a three-phase AC source where each phase has two or more AC ports 1651 connected electrically in series. The DC ports 1650 are connected electrically in parallel, but may be or include any combination of series and parallel connections.

The three phases composed of series converters are shown in a Y configuration, but they may also be configured in a delta configuration. By having or connecting two or more AC ports of the DC-AC converters in series, higher voltages may be achieved at the output. The voltage level at the AC ports 1651 may include but are not limited to 2400 VAC, 4160 VAC, 6900 VAC, 13,800 VAC, and 34,500 VAC. Other examples are possible. The converters 1600 may be the same as the DC-AC converters 900 described above with respect to FIGS. 9-13.

Figure 17A:
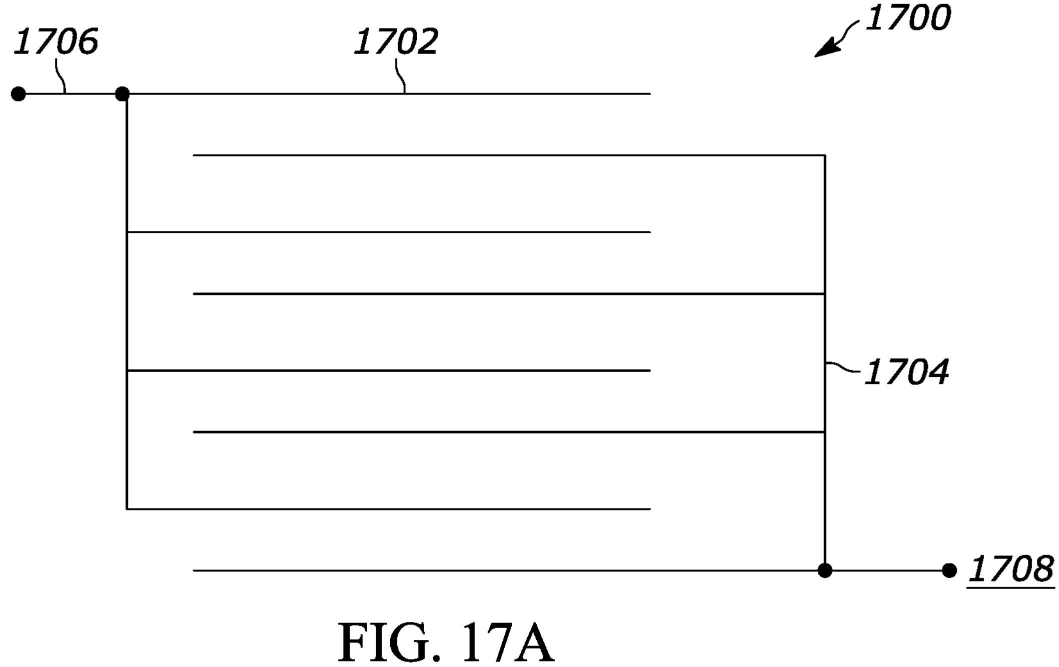
FIG. 17A and FIG. 17B comprise diagrams of a transformer with interleaved windings according to various embodiments of the present invention.
Figure 17B:
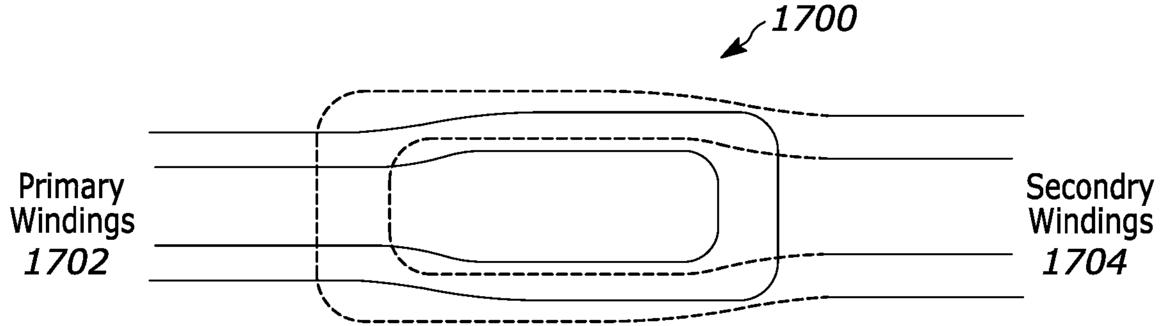

FIGS. 17A and 17B illustrate a transformer 1700 with windings implemented in a multi-layer circuit board. The primary windings 1702 (windings 976 in FIG. 9) and the secondary 1704 (windings 977 in FIG. 9) implemented in the multiple PCB layer are effectively interleaved.

FIG. 17A illustrates a diagram illustrating how the primary windings 1702 are disposed between the secondary windings 1704. Electrical connections 1706 couple the primary windings 1702 to other components of the converter (e.g., the inverter bridge 920 of FIG. 9) and electrical connections 1708 connect the secondary windings 1704 to other components of the converter (e.g., the switches 925 and 926 of FIG. 9). FIG. 17B represents a three-dimensional, cutaway, perspective diagram showing the components of FIG. 17A disposed in a transformer housing 1710. The interleaved configuration of the transformer 1700 is advantageous because it reduces any transformer leakage inductance. Although one example of a transformer that is interleaved is shown, it will be appreciated that other types of transformers may be utilized in the circuits provided herein.

It will be appreciated that any embodiment of the converters provided herein or multiple configurations thereof may be used to charge and discharge a capacitor, supercapacitor or battery. For example, the DC power source 160 may be a battery that is connected to either port 150 or 151 of the non-isolated DC-DC power converter 100. The DC power source 660 may be coupled to either port 650 or 651 of the isolated DC-DC power converter 600. The DC power source 960 may be coupled to the DC port 950 of the isolated DC-AC power converter 900. The batteries may be any stationary battery or any battery in a vehicle. The battery may be a lead-acid Li-ion battery, or include any other type of chemistry.

It will be additionally appreciated that any embodiment of the converters provided herein or multiple configurations thereof may be used to accept power from a renewable energy source such as solar photo-voltaic (PV) power, wind power or Hydropower to mention a few examples. More specifically, the renewable energy source may be connected to either port of the non-isolated DC-DC power converter 100, either port of the isolated DC-DC power converter 600, or the DC port 950 of the isolated DC-AC power converter 900.

It will be further appreciated that any embodiment of the converters provided herein or multiple configurations thereof and described herein may be used to accept power from a fuel cell. More specifically, the fuel cell may be connected to either port of the non-isolated DC-DC power converter 100, either port of the isolated DC-DC converter 600, or the DC port 950 of the isolated DC-AC power converter 900.

It will also be appreciated that any embodiment of the converters provided herein or multiple configurations thereof and described herein may be used to provide power to an electrolyzer that may produce hydrogen or other element. More specifically, the electrolyzer may be connected to either port of the non-isolated DC-DC power converter 100, either port of the isolated DC-DC power converter 600, or the DC port 950 of the isolated DC-AC power converter 900.

It should be obvious to one skilled in the art that anywhere the term "switch" or "mosfet" is used here-in, any transistor switching device, including but not limited to SiC Mosfet, GAN Mosfet, Silicon Mosfet, bi-polar junction (BJT), integrated gate bi-polar (IGBT), or other switching device may be used. In addition, other examples are possible.

While there have been illustrated and described particular embodiments of the present invention, those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A power converter, the power converter comprising:

a DC port and an AC port;

a full-bridge inverter comprising a plurality of individually controlled switches with the parallel connection points of the full-bridge inverter switches coupled to the DC port;

a transformer with a first winding and second winding, wherein the first winding is coupled to the series connection points of the full bridge inverter;

at least one individually controlled switch coupled to a first terminal of the second winding of the transformer and a first terminal of the AC port;

at least one individually controlled switch coupled to the second terminal of the second winding of the transformer and a second terminal of the AC port;

wherein activation and deactivation of the plurality of individually controllable switches is effective to control a magnetizing inductance of the transformer and achieve an output goal of the power converter;

a control apparatus that is configured to control operation of the plurality of individually controllable switches, the control apparatus also configured to simulate the current in the magnetizing inductance of the transformer and determine switch settings of the plurality of individually controllable switches based at least in part upon the simulated current, wherein the control apparatus exclusively utilizes electronic hardware components to determine the simulated current and switch settings.

2. The power converter of claim 1, wherein the power converter is one of a plurality of DC to AC converters and the plurality of DC to AC converters are deployed in a split phase or a 3-phase configuration.

3. The power converter of claim 1, wherein the AC port of the power converter is connected in series or parallel with at least one other power converter.

4. The power converter of claim 1, wherein the DC port of the power converter is connected in series or parallel with at least one other power converter.

5. The power converter of claim 1, wherein the AC port is connected to a utility grid and wherein the current delivered to and from the grid is controlled at least in part by controlling the current in the magnetizing inductance.

6. The power converter of claim 1, wherein the AC port is connected to an AC load and wherein the voltage delivered to the AC load is controlled at least in part by controlling the current in the magnetizing inductance.

7. The power converter of claim 1, wherein the first winding and second winding of the transformer have a substantially interleaved placement with respect to each other.

8. The power converter of claim 1, wherein the DC port is coupled to a battery and the AC port is coupled to a utility grid wherein the battery can be charged and discharged from the utility grid.

* * * * *